US 6,616,343 B2

(12) United States Patent
Katsura et al.

(10) Patent No.: US 6,616,343 B2
(45) Date of Patent: Sep. 9, 2003

(54) MULTICHANNEL FERRULE FOR OPTICAL CONNECTOR (75) Inventors: Hiroshi Katsura, Yokohama (JP);
Wataru Sakurai, Yokohama (JP);
Toshiaki Kakii, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/796,598

(22) Filed: Mar. 2, 2001

(65) Prior Publication Data
US 2001/0031116 A1 Oct. 18, 2001

(30) Foreign Application Priority Data
Mar. 17, 2000 (JP) .................................. P2000-076515

(51) Int. Cl.⁷ ................................................. G02B 6/38
(52) U.S. Cl. ............................. 385/55; 385/60; 385/78
(58) Field of Search ........................ 385/59, 60, 65, 385/71, 72, 78, 83, 122, 123, 141, 55, 124–126

(56) References Cited

U.S. PATENT DOCUMENTS

| 4,767,429 A | * | 8/1988 | Fleming et al. ............... 65/3.11 |
| 5,034,447 A | | 7/1991 | Izumida et al. |
| 5,767,186 A | * | 6/1998 | Shimokusuzono et al. .. 524/502 |
| 6,076,737 A | * | 6/2000 | Gogami et al. ............. 235/492 |

FOREIGN PATENT DOCUMENTS

| EP | 0 704 486 | 4/1996 |
| EP | 1 003 055 A1 | 5/2000 |
| JP | 3-239756 A | 10/1991 |
| JP | 4-156798 A | 5/1992 |
| JP | 7-053869 A | 2/1995 |
| JP | 07/318759 | 12/1995 |
| JP | 09-090169 | 4/1997 |
| JP | 10-031134 | 2/1998 |
| WO | WO95/25770 | 9/1995 |
| WO | WO99/53352 A | 10/1999 |
| WO | 99/53352 | 10/1999 |

OTHER PUBLICATIONS

"Injection–Molded Polish–free 2–ch Connectors", Hiroshi Katsura et al., 1999 Proceedings 49th. Electronic Components and Technology Conference. ECTC 1999, San Diego, CA, Jun. 1–4, 1999, Proceedings of the Electronic Components and Technology Conference, New York, NY; IEEE, US, Jun. 1, 1999, pp. 386–391. XP000903815, ISBN: 0–7803–5232–7.

* cited by examiner

Primary Examiner—Lynn Feild
Assistant Examiner—Son V. Nguyen
(74) Attorney, Agent, or Firm—McDermott, Will & Emery (57) ABSTRACT The optical fiber positioning member in accordance with the present invention comprises a resin composition containing a PPS resin mainly composed of a linear type PPS resin at a content in the range of 24% to 30% by weight, silica particles at a content in the range of 61% to 67% by weight, and tetrapod-shaped whiskers at a content in the range of 6% to 12% by weight.

12 Claims, 4 Drawing Sheets

MULTICHANNEL FERRULE FOR OPTICAL CONNECTOR

BACKGROUND OF THE INVENTION

1. Field of the Invention

The present invention relates to an optical fiber positioning member used for optically connecting optical fibers to each other.

2. Related Background Art

Optical connectors are usually in use for connecting optical fibers employed in optical communications, whereas optical fiber positioning members such as ferrule and sleeve are used in the optical connectors. Such optical fiber positioning members necessitate a high dimensional accuracy since they are required to carry out positioning of the respective axial centers of optical fibers to be butted against each other at a high accuracy, and also demand a high dimensional stability when they are to be used over a long period of time. At the same time, the optical fiber positioning members are required to have not only a sufficient mechanical strength but also a long-term durability since they are repeatedly attached and detached.

As such an optical fiber positioning member, ferrules obtained by transfer-molding of epoxy resins, which are thermosetting resins, have conventionally been known, for example. However, such ferrules molded from thermosetting resins take time for curing while molding, whereby their productivity lowers.

Therefore, thermoplastic resins have come into use in optical fiber positioning members in order to improve the productivity.

For example, Domestic Republication WO95/25770 discloses a ferrule comprising a resin composition which contains a polyphenylene sulfide resin or the like at a content in the range of 20% to 40% by weight, spherical fine particles of silica or the like at a content in the range of 40% to 60% by weight and whiskers such as potassium titanate whiskers, aluminum borate whiskers, silicon carbide whiskers, silicon nitride whiskers, zinc oxide whiskers, alumina whiskers, graphite whiskers, or the like at a content in the range of 15% to 25% by weight.

On the other hand, Publication WO99/53352 discloses a ferrule comprising a resin composition which contains a polyphenylene sulfide resin, silica particles, and zinc oxide whiskers at a content in the range of 5% to 30% by weight and silicate whiskers at a content in the range of 5% to 30% by weight.

SUMMARY OF THE INVENTION

The inventors have studied the prior art mentioned above. As a result, the inventors have found that the above-mentioned prior art has problems as follows.

Namely, though the ferrule disclosed in Domestic Republication WO95/25770 is advantageous in terms of dimensional accuracy since it contains silica particles and whiskers in its resin composition, it may not have a sufficient strength at its parts surrounding guide holes into which guide pins are inserted, so that the parts of ferrule surrounding the guide holes may chip off when the guide pins are inserted into and pulled out of the guide holes. In MPO optical connectors of push-on/pull-off type, in particular, guide pins may be impulsively inserted into guide holes of the ferrule while being shifted or tilted with respect to the guide holes, whereby the parts of ferrule surrounding the guide holes are apt to chip off. As a consequence, the ferrule requires replacement and the like at a relatively early stage, so that it may fail to be used over a long period of time. Also, its dimensional stability cannot be considered sufficient.

Though the ferrule disclosed in Publication WO99/53352 is considered to be advantageous in terms of dimensional accuracy, dimensional stability, mechanical strength, and long-term durability, it is required to further improve these performances.

It is an object of the present invention to provide an optical fiber positioning member which can further improve its dimensional accuracy, mechanical strength, dimensional stability, and long-term durability.

In order to achieve the above-mentioned object, the inventors have carried out diligent studies. Namely, while packing a polyphenylene sulfide resin (hereinafter referred to as "PPS resin"), silica particles, and whiskers into a resin composition constituting an optical fiber positioning member, and varying the respective packing amounts of the PPS resin, silica particles, and whiskers, as well as the structure of PPS resin and kinds of whiskers to be packed, the inventors evaluated the dimensional accuracy, mechanical strength, dimensional stability, and long-term durability of the resulting resin compositions. As a result, the inventors have found that the above-mentioned object can be achieved when the respective packing amounts of PPS resin, silica particles, and whiskers are within their predetermined ranges, and a PPS resin having a specific structure and whiskers having a specific form are used as the PPS resin and the whiskers, respectively, thereby accomplishing the present invention.

Namely, the optical fiber positioning member in accordance with the present invention comprises a resin composition containing a PPS resin mainly composed of a linear type PPS resin at a content in the range of 24% to 30% by weight, silica particles at a content in the range of 61% to 67% by weight, and tetrapod-shaped whiskers at a content in the range of 6% to 12% by weight.

In the optical fiber positioning member of the present invention, tetrapod-shaped whiskers have such a low anisotropy that its coefficient of thermal shrinkage at the time of molding has a lower anisotropy, better mold-transferability, and an improved dimensional accuracy as compared with optical fiber positioning members containing not only this kind of whiskers but also other kinds of whiskers (which are fibrous in general) in addition thereto. Also, since the linear type PPS resin itself has a better fluidity as compared with cross-linked type PPS resins and the like, the fluidity of resin composition further improves. Therefore, a pressure is fully transmitted to the whole mold cavity at the time of molding the resin composition including the linear type PPS resin, whereby the density of the resulting optical fiber positioning member increases. Also, the linear type PPS resin has a higher tenacity than the other types of PPS resins do. Consequently, when the contents of silica particles and tetrapod-shaped whiskers are held constant in the resin composition, a higher mechanical strength is obtained in the optical fiber positioning member using the PPS resin mainly composed of the linear type PPS resin. Here, if the content of tetrapod-shaped whiskers is less than 6% by weight, then the effect of combining them does not become apparent, whereby anisotropy occurs in the coefficient of thermal shrinkage, which may generate warps and distortions in the optical fiber positioning member. If the content exceeds 12% by weight, then the reinforcing effect with respect to the PPS resin becomes weaker, whereby the mechanical strength of the optical fiber positioning member lowers. If the content of the PPS resin mainly composed of the linear type PPS resin is less than 24% by weight, then the moldability of the resin composition deteriorates, thereby lowering its dimensional accuracy. If the content exceeds 30% by weight, by contrast, then the reinforcing effects of silica particles and tetrapod-shaped whiskers with respect to the PPS resin become weaker, whereby the mechanical strength of the optical fiber positioning member lowers. If the content of silica particles is less than 61% by weight, then the coefficient of linear expansion of the whole resin composition becomes so high that its dimensional accuracy lowers, and its modulus of elasticity becomes so low that the mechanical strength of the optical fiber positioning member lowers. If the content exceeds 67% by weight, then the fluidity of the resin composition at the time of molding becomes so low that the moldability of resin composition deteriorates, whereby its dimensional accuracy lowers. Also, the resin composition becomes brittle since the content of PPS resin decreases.

Preferably, in the optical fiber positioning member, the silica particles have one relative maximum value in each of particle size ranges of 0.3 to 0.8 μm and 4 to 7 μm in a particle size distribution thereof.

If a relative maximum value exists within each of the above-mentioned two ranges, then it will be advantageous that silica particles having a smaller particle size enter gaps among silica particles having a larger particle size, thereby improving the packing ratio. Also, when the silica particles having the above-mentioned particle size distribution and silica particles in which at least one of the two relative maximum values is out of the above-mentioned ranges are at the same packing ratio, the fluidity of the resin composition improves more in the case with the silica particles having the above-mentioned particle size distribution since the contact resistance between silica particles is lowered.

Preferably, in the optical fiber positioning member, the tetrapod-shaped whiskers are zinc oxide whiskers.

When whiskers having a tetrapod shape (a three-dimensional form obtained by connecting the center of gravity of a regular tetrahedron and its vertices) are used as such, their anisotropy is low, whereby there is a tendency that the resulting member exhibits a lower anisotropy in coefficient of thermal shrinkage at the time of molding, a better mold-transferability, and an improved dimensional accuracy as compared with the case containing other kinds of whiskers.

Preferably, in the optical fiber positioning member, the content of the linear type PPS resin in the PPS resin is 95% to 100% by weight.

If the content of the linear type PPS resin in the PPS resin is less than 95% by weight, then the fluidity of the resin composition decreases, and the uniformity in density of the optical fiber positioning member decreases, whereby its mechanical strength tends to lower.

Preferably, in the optical fiber positioning member, the melting viscosity of the linear type PPS resin at 300° C. is 100 to 500 poises.

If the melting viscosity is less than 100 poises, then the molecular weight of the linear type PPS resin is so low that its mechanical strength tends to lower. If the melting viscosity exceeds 500 poises, then the fluidity of the resin composition deteriorates, so that the dimensional accuracy tends to lower.

Preferably, in the optical fiber positioning member, the average particle size of silica particles is 0.2 to 7 μm.

If the average particle size is less than 0.2 μm, then the fluidity of the resin composition lowers at the time of molding, so that the molding becomes unstable, whereby the dimensional accuracy tends to deteriorate. If the average particle size exceeds 7 μm, then irregularities on the order of microns occur when silica particles are precipitated on the surface, whereby the dimensional accuracy tends to lower. Further, the surface area of silica decreases, whereby its strength tends to lower.

Preferably, in the optical fiber positioning member, the content of tetrapod-shaped whiskers in the resin composition is 8% to 12% by weight, 6% to 10% by weight, or 8% to 10% by weight.

Preferably, in the optical fiber positioning member, the total content of silica particles and tetrapod-shaped whiskers in the resin composition is 70% to 76% by weight.

If the total content is less than 70% by weight, then the coefficient of linear expansion of the whole resin composition becomes higher, whereby the dimensional accuracy of the optical fiber positioning member tends to lower. If the total content exceeds 76% by weight, then the fluidity of the resin composition lowers at the time of molding, so that the moldability deteriorates, whereby the dimensional accuracy tends to lower, and the mechanical strength tends to become insufficient.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, the optical fiber positioning member in accordance with the present invention will be explained in detail.

The optical fiber positioning member of the present invention comprises a resin composition containing a PPS resin, silica particles, and tetrapod-shaped whiskers. Here, the PPS resin is used since it is advantageous in terms of dimensional stability, creep characteristics, and moldability. In general, PPS resins include cross-linked (branched) type PPS resins and linear type PPS resins. The PPS resin used in the present invention is a PPS resin mainly composed of a linear type PPS resin. The linear type PPS resin is used as a main component because of the following reasons. Namely, if the linear type PPS resin is used as a main component, it is possible to lower the molecular weight of the PPS resin, thus obtaining the resin composition with good fluidity. As a consequence, a pressure is fully transmitted to a mold cavity as a whole. Hence, the resulting optical fiber positioning member attains a uniform density, thereby further improving its mechanical strength. The content of linear type PPS resin in the PPS resin is usually 95% to 100% by weight. If the content of linear type PPS resin in the PPS resin is less than 95% by weight, then the fluidity of the resin composition lowers, so that the uniformity in density of the optical fiber positioning member deteriorates, whereby the mechanical strength tends to lower. The melting viscosity of the linear type PPS resin at 300° C. is usually 100 to 500 poises, preferably 150 to 250 poises. If the melting viscosity is less than 100 poises, then the molecular weight of linear type PPS resin is so low that the mechanical strength tends to lower. If the melting strength exceeds 500 poises, then the fluidity of the resin composition deteriorates, whereby the dimensional accuracy tends to lower. The content of PPS resin in the resin composition is usually 24% to 30% by weight. If the content is less than 24% by weight, then the moldability of the resin composition deteriorates, thereby lowering its dimensional accuracy. If the content exceeds 30% by weight, then the reinforcing effect of fillers silica particles and whiskers) with respect to the PPS resin becomes weaker, whereby the mechanical strength of the optical fiber positioning member lowers.

The resin composition used in the optical fiber positioning member of the present invention contains silica particles. It is because of the fact that silica particles in general have a low coefficient of liner expansion and a small anisotropy, which can improve the dimensional accuracy of the optical fiber positioning member. While the silica particles may have forms such as spherical and crushed ones, they preferably have a spherical form. The silica particles in a spherical form exhibit a lower anisotropy than in a crushed form and the like. Preferably, the silica particles have an average particle size of 0.2 to 7 $\mu$m. If the average particle size is less than 0.2 $\mu$m, then the fluidity of the resin composition lowers at the time of molding, so that the molding becomes unstable, whereby the dimensional accuracy tends to lower. If the average particle size exceeds 7 $\mu$m, then irregularities on the order of microns occur when silica particles are precipitated on the surface, whereby the dimensional accuracy tends to lower. Further, the surface area of silica decreases, whereby its strength lowers.

If the silica particles are a mixture of two kinds of silica particles having respective particle size distributions different from each other, then the mixture can have two relative maximum values in its particle size distribution. Preferably, these two relative maximum values lie within the ranges of 0.3 to 0.8 $\mu$m and 4 to 7 $\mu$m, respectively, in the particle size distribution. If the relative maximum values exist one by one in the two ranges, then it will be advantageous that silica particles having a smaller particle size enter gaps among silica particles having a larger particle size, thereby improving the packing ratio. Also, when the silica particles having the above-mentioned particle size distribution in which two relative maximum values lie within the above two ranges respectively, and silica particles in which at least one of the two relative maximum values is out of the above-mentioned ranges are at the same packing ratio, the fluidity of the resin composition improves more in the case with the silica particles having the above-mentioned particle size distribution in which two relative maximum values lie within the above two ranges respectively since the contact resistance between silica particles loweres.

The content of silica particles in the resin composition used in the present invention is 61% to 67% by weight. If the content of silica particles is less than 61% by weight, then the coefficient of linear expansion of the whole resin composition becomes so high that its dimensional accuracy lowers, and its modulus of elasticity becomes so low that the strength of the optical fiber positioning member lowers. If the content of silica particles exceeds 67% by weight, by contrast, then the fluidity of the resin composition at the time of molding becomes so low that the moldability thereof deteriorates, whereby the dimensional accuracy of the optical fiber positioning member lowers. Also, in this case, the resin composition becomes brittle since the ratio of PPS resin decreases.

Preferably, the tetrapod-shaped whiskers used in the present invention are zinc oxide whiskers. Whiskers having a tetrapod shape (a three-dimensional form obtained by connecting the center of gravity of a regular tetrahedron and its vertices) are used as such, since their anisotropy is low, whereby there is a tendency that the resulting member exhibits a lower anisotropy in coefficient of thermal shrinkage at the time of molding, a better mold-transferability, and an improved dimensional accuracy as compared with the case containing other kinds of whiskers.

Preferably, tetrapod-shaped whiskers are used alone as the whiskers without using other whiskers. It is because of the fact that tetrapod-shaped whiskers exhibit a lower anisotropy as compared with optical fiber positioning members containing not only this kind of whiskers but also other kinds of whiskers (which are fibrous in general) together therewith, thereby being advantageous in improving the dimensional accuracy.

A tetrapod-shaped whisker has four needle-like portions. Preferably, these four needle-like portions have an average length of 2 to 10 $\mu$m. If the average length is less than 2 $\mu$m, then the surface area increases, so that the fluidity of the resin composition deteriorates, whereby the dimensional accuracy tends to lower. If the average length exceeds 10 $\mu$m, then it becomes greater than silica particle, whereby the fluidity of the resin composition tends to deteriorate. Preferably, the needle-like portions have an average diameter of 0.2 to 2 $\mu$m at their base part. If the average diameter is less than 0.2 $\mu$m, then the needle-like portions become too thin, so that they become shorter and their surface areas increase, whereby the fluidity of the resin composition tends to deteriorate. If the average diameter exceeds 2 $\mu$m, then the needle-like portions become thicker and longer, so that they interfere with silica particles, whereby the fluidity of the resin composition tends to deteriorate. Preferably, the needle-like portions in tetrapod-shaped whiskers have an aspect ratio (average length/average diameter) of 2 to 20. If the aspect ratio is less than 2, then the reinforcing effect with respect to the PPS resin tends to become insufficient. If the aspect ratio exceeds 20, then the fluidity of the resin composition tends to deteriorate.

The content of tetrapod-shaped whiskers in the resin composition is at least 6% by weight, preferably at least 8% by weight. If the content of tetrapod-shaped whiskers is less than 6% by weight, then the effect of combining them does not become apparent, whereby anisotropy occurs in the coefficient of thermal shrinkage, which may generate warps and distortions in the optical fiber positioning member. The content of tetrapod-shaped whiskers in the resin composition is 12% by weight or less, preferably 10% by weight or less. If the content of tetrapod-shaped whiskers exceeds 12% by weight, then their reinforcing effect by tetrapod-shaped whiskers with respect to the PPS resin becomes weaker, whereby the mechanical strength of the optical fiber positioning member lowers.

Preferably, the total content of the silica particles and tetrapod-shaped whiskers in the resin composition is 70% to 76% by weight. If the total content is less than 70% by weight, then the coefficient of linear expansion of the whole resin composition becomes higher, whereby the dimensional accuracy of the optical fiber positioning member tends to lower. If the total content exceeds 76% by weight, then the fluidity of the resin composition lowers at the time of molding, so that the moldability deteriorates, whereby the dimensional accuracy tends to lower, and the mechanical strength tends to become insufficient.

While the resin composition used in the present invention is constituted by the PPS resin, silica particles, and tetrapod-shaped whiskers, very fine fillers other than the silica particles and whiskers, pigments, stabilizers, coupling agents, fire retardants, and the like may be added thereto within ranges which do not impair the aimed performances.

While the resin composition used in the present invention can be kneaded by a normal kneading method in which fillers are compounded into the resin composition, it is preferably kneaded by use of a kneading apparatus having a high kneading effect which can fully disperse fillers and other components into the resin composition. Examples of such a kneading apparatus include uniaxial or biaxial extruders and kneaders.

Examples of the optical fiber positioning member in accordance with the present invention include ferrules and sleeves, which are applicable to various kinds of optical connectors such as MT optical connectors and MPO optical connectors explained in the following.

Figure 1:
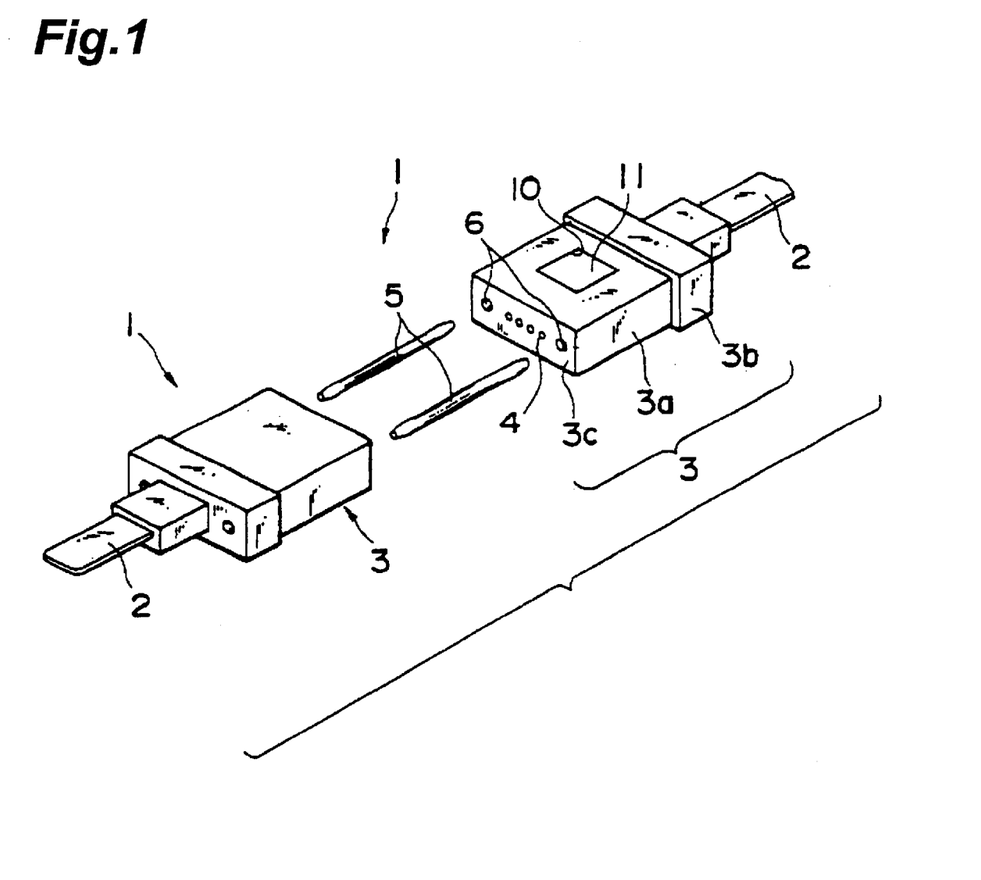
FIG. 1 is a perspective view showing the state before coupling of MT optical connectors, each employing a ferrule as the optical fiber positioning member of the present invention.
Figure 2:
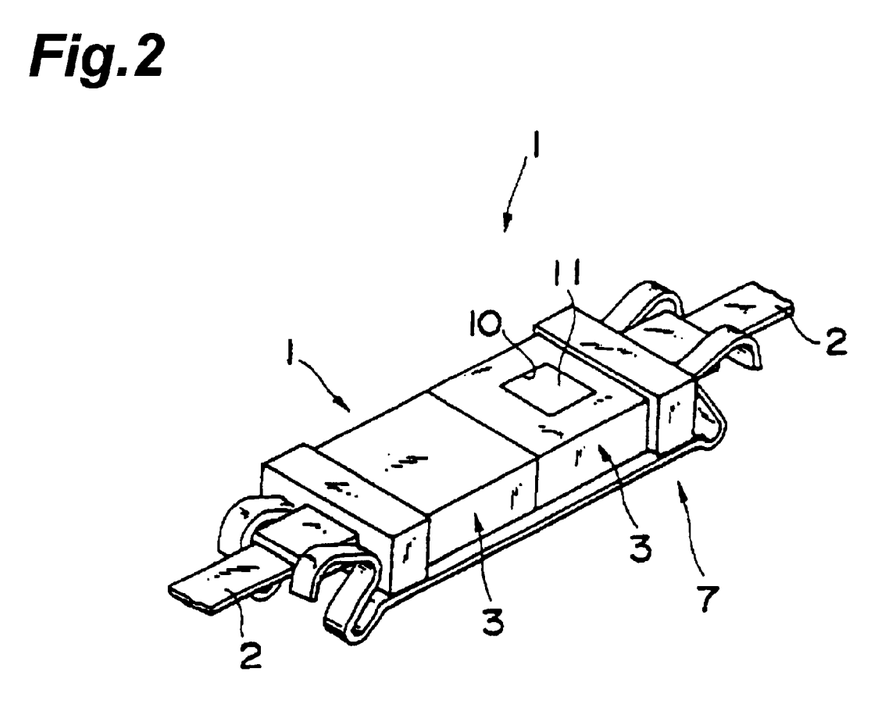
FIG. 2 is a perspective view showing the state after coupling of MT optical connectors, each employing a ferrule as the optical fiber positioning member of the present invention.

FIG. 1 is a perspective view showing MT optical connectors each employing a multichannel ferrule as the optical fiber positioning member, indicating the state before multichannel connectors are connected to each other. FIG. 2 is a perspective view showing the MT optical connectors after the multichannel ferrules of FIG. 1 are connected to each other. As shown in FIG. 1, the MT optical connectors 1 comprise a set of ferrules 3, 3 for securing coated optical fibers; a pair of rod-shaped guide pins 5, 5 to be inserted into the ferrules 3, 3 for connecting the ferrules 3, 3 to each other; and a binding clip 7 for binding together the ferrules 3, 3 butted against each other. The ferrule 3 comprises a flat connecting portion 3a and a block-shaped fiber-inserting portion 3b integrally provided with one end of the connecting portion 3a. For example, a 4-fiber ribbon 2 is inserted into the fiber-inserting portion 3b, whereas four optical fibers 4 exposed by pealing off the coating at the front end portion of the fiber ribbon 2 are accommodated in the connecting portion 3a. Also, in the connecting portion 3a a window hole 10 is formed, through which an adhesive 11 such as epoxy resin is injected, so as to secure the coated optical fibers 4. Further, in the ferrule 3 guide holes 6, 6 are formed each of which has a substantially circular inner periphery to fit a pair of guide pins 5, 5.

Figure 3:
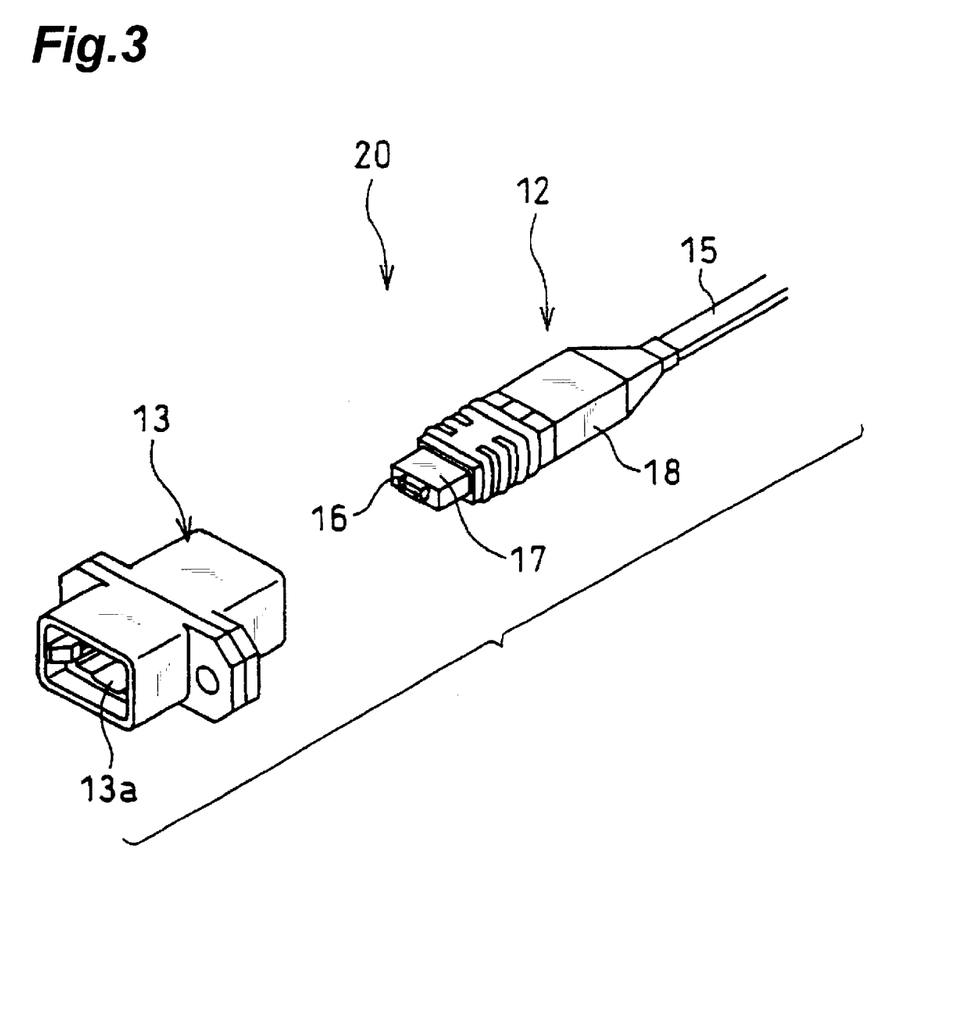
FIG. 3 is a perspective view showing an MPO optical connector employing a ferrule as the optical fiber positioning member of the present invention.
Figure 4:
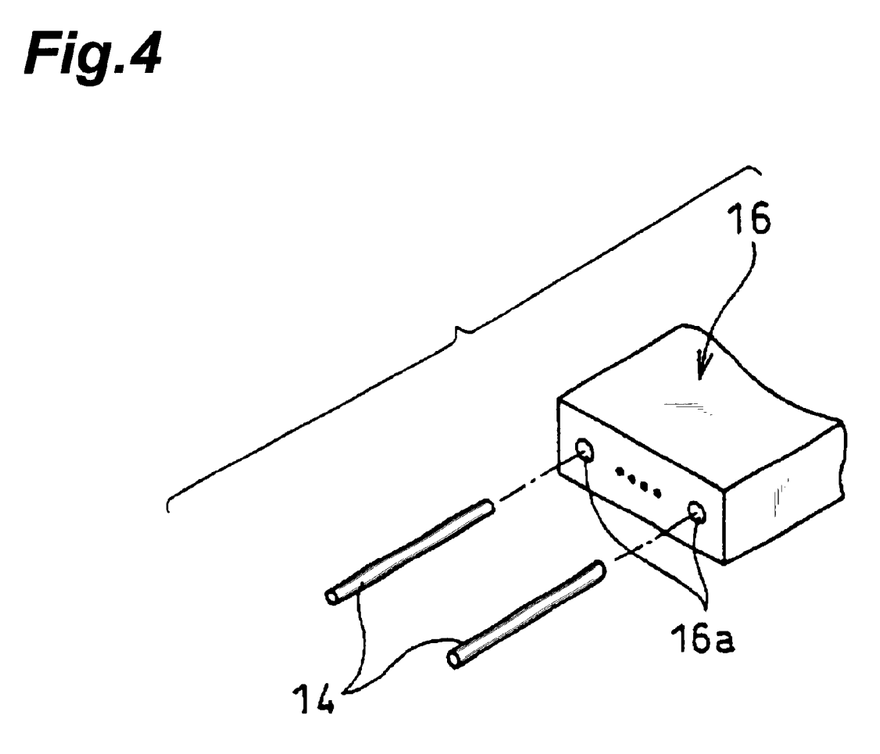
FIG. 4 is an enlarged perspective view showing the ferrule of FIG. 3.

FIG. 3 is a perspective view showing an MPO optical connector employing a ferrule as the optical fiber positioning member of the present invention, whereas FIG. 4 is an enlarged view showing the ferrule of FIG. 3. As shown in FIGS. 3 and 4, the MPO optical connectors 20 comprise a pair of plugs (not showing one of them) 12, an adapter 13 having a guide hole 13a for guiding and accommodating these plugs 12, and a pair of guide pins 14, 14 used for connecting the plugs 12 to each other. The plug 12 is constituted by a ferrule 16 for securing a front end portion of a fiber ribbon 15, a ferrule securing member 17 for accommodating the ferrule 16 therein, and a cover 18 for accommodating the ferrule securing member 17 therein, whereas the ferrule 16 has a configuration identical to that of the ferrule 3 in the MT optical connector 1. Hence, in the ferrule 16 a pair of guide holes 16a, 16a are formed such that the guide pins 14, 14 are inserted thereinto. In such an MPO optical connector 20, since the guide pins 14 may be inserted into the guide holes 16a while being shifted or tilted with respect thereto, a high mechanical strength is required in the ferrule 16. Therefore, the ferrule 16 as the positioning member of the present invention is also suitable for the MPO optical connector 20.

The present invention will now be explained more specifically with reference to Examples.

EXAMPLES

A ferrule to be used in an MT optical connector was made as an optical fiber positioning member. First, for making the ferrule, a PPS resin having a melting viscosity of 180 to 200 poises at 300° C. and containing at least 99% by weight of a linear type PPS resin, silica particles, and whiskers were prepared. Subsequently, the PPS resin, silica particles, and whiskers were mixed. The resulting mixture was supplied to a biaxial extruder (PCM-45 manufactured by Ikegai Corporation) and melted and kneaded therein, whereby a pellet-like resin composition was obtained. Then, the pellet-like resin composition was molded by using a horizontal injection moding machine with a clamping force of 30 t, whereby a 4-core ferrule (having dimensions of about 6 mm×8 mm×2.5 mm) such as those shown in FIGS. 1 and 2 was obtained. Here, the diameter of the guide hole formed in the ferrule was set to 700 $\mu$m. The dimensional accuracy, dimensional stability, mechanical strength, and long-term durability of this ferrule were evaluated as follows.

Namely, the dimensional accuracy of the ferrule was evaluated by the connection loss of MT optical connectors and the roundness. Here, the MT optical connectors were prepared as follows. Namely, a pair of ferrules and two 4-fiber ribbons each having four single-mode optical fibers were prepared, the fiber ribbons were secured to the respective ferrules by use of an adhesive, and the end faces of each fiber ribbon were ground. Subsequently, a pair of guide pins were used for connecting the ferrules to each other, thus preparing the MT optical connectors.

The connection loss of MT optical connectors was determined by introducing laser light having a wavelength of 1.3 $\mu$m into one fiber ribbon by use of a laser diode (regulated light source AQ-4139 manufactured by Ando Electric Co., Ltd.), and detecting the light emitted from the other fiber ribbon by a power meter (optical power meter AQ-1135E manufactured by Ando Electric Co., Ltd.). Also, "roundness" was determined by the difference between the maximum inside diameter and minimum inside diameter of the guide hole of ferrule at a position distanced by 1 mm from the end face thereof, and was measured by a stylus type roundness meter.

The mechanical strength of ferrule was evaluated by "breaking strength." Here, "breaking strength" means a load at which the guide pin hole 6 breaks when one end of a stainless guide pin having a length of 11 mm is inserted thereinto by about 1 mm and the load is applied at a speed of 0.1 mm/second at a position distanced by 4 mm from the other end of the guide pin so as to deform the guide pin.

The dimensional stability of the ferrule was evaluated by measuring the changes in connection loss of the optical connector between before and after a heat cycle test from −40 to 75° C.

The long-term durability of the ferrule was evaluated by repeating the attaching/detaching operations of the optical connectors 250 times, and measuring the changes in connection loss of the MT optical connectors between before and after the operations.

Each of the measuring operations for optical connector connection loss, optical connector connection loss change caused by repeated attachment/detachment, and optical connector connection loss change between before and after the heat cycle test was carried out for 10 optical connectors, and an average value thereof was determined. Also, each of the measuring operations for the roundness of the guide hole of the ferrule and breaking strength was carried out for 5 optical connectors, and an average value thereof was determined.

Example 1

A mixture of fused silica particles having an average particle size of 0.5 $\mu$m (SCM QZ fused, manufactured by Izumitech Co., Ltd.) and fused silica particles having an average particle size of 5 $\mu$m (manufactured by Izumitech Co., Ltd.) as silica particles, and zinc oxide whiskers (Pana-Tetra manufactured by Matsushita Amtec Co., Ltd.) as whiskers were prepared. The zinc oxide whiskers were shaped like tetrapods, whose needle-like portions extending from the center had an average length of 15 $\mu$m and an average diameter of 2 $\mu$m, respectively The PPS resin, silica particles, and zinc oxide whiskers were mixed such that the contents in the resin composition became their respective values shown in Table 1, whereby ferrules for MT connectors were made.

For these ferrules, the optical connector connection loss, roundness, breaking strength, optical connector connection loss change between before and after the heat cycle test, and optical connector connection loss change caused by repeated attachment/detachment were measured. The results were shown in Table 1.

Example 2

Ferrules for MT connectors were made in a manner similar to Example 1 except that the contents of PPS resin, silica particles, and zinc oxide whiskers in the resin composition were set to their respective values shown in Table 1 and that calcium silicate whiskers (FPW400 manufactured by Kinsei Matec Co., Ltd.) were further included as the whiskers in the resin composition.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that the ferrules in accordance with this Example exhibit lower optical connector connection loss, roundness, and optical connector connection loss change, and greater breaking strength as with the ferrule of Example 1.

Example 3

Ferrules for MT connectors were made in a manner similar to Example 1 except that the contents of PPS resin, silica particles, and zinc oxide whiskers in the resin composition were set to their respective values shown in Table 1.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that the ferrules in accordance with this Example exhibit lower optical connector connection loss, roundness, and optical connector connection loss change, and greater breaking strength as with the ferrule of Example 1.

|  | Contents in resin composition (wt %) | | | | | | Evaluation of ferrule (optical connector) | | | | |
| --- | --- | --- | --- | --- | --- | --- | --- | --- | --- | --- | --- |
|  | PPS resin | Silica particles | Calcium silicate whiskers | Zinc oxide whiskers | total whiskers | Silica particles + Whiskers | Optical connector connection loss (dB) | Roundness ($\mu$m) | Breaking strength (gf) | Optical connector connection loss change in heat cycle test (dB) | Optical connector connection loss change in repeated attachment/ detachment test (dB) |
| Ex. 1 | 27 | 64 | — | 9 | 9 | 73 | 0.13 | 0.3 | 600 | 0.2 | 0.2 |
| Ex. 2 | 26 | 62 | 5 | 7 | 12 | 74 | 0.15 | 0.4 | 650 | 0.2 | 0.2 |
| Ex. 3 | 25 | 63 | — | 12 | 12 | 75 | 0.15 | 0.4 | 750 | 0.2 | 0.2 |
| Comp. Ex. 1 | 22 | 60*1 | — | 18 | 18 | 78 | 0.22 | 0.5 | 300 | 0.4 | 1.0 |
| Comp. Ex. 2 | 23 | 50*2 | 17 | 10 | 27 | 77 | 0.25 | 0.6 | 600 | 0.3 | 0.3 |
| Comp. Ex. 3 | 21 | 67 | — | 12 | 12 | 79 | 0.21 | 0.6 | 300 | 0.3 | 1.0 |
| Comp. Ex. 4 | 30 | 59 | — | 11 | 11 | 70 | 0.25 | 0.6 | 500 | 0.4 | 0.3 |
| Comp. Ex. 5 | 24 | 62 | — | 14 | 14 | 76 | 0.22 | 0.7 | 650 | 0.3 | 0.3 |
| Comp. Ex. 6 | 29 | 67 | — | 4 | 4 | 71 | 0.17 | 0.4 | 400 | 0.3 | 0.5 |

*1 Silica particle with average particle size of 4.5 $\mu$m
*2 Silica particle with average particle size of 0.5 $\mu$m

Comparative Example 1

Ferrules for MT connectors were made in a manner similar to Example 1 except that the PPS resin, silica particles, and zinc oxide whiskers in the resin composition were mixed at their respective contents shown in Table 1, while using silica particles having an average particle size of 4.5 μm as the silica particles, and zinc oxide whiskers whose needle-like portions have an average length of 30 μm and an average diameter of 3 μm as the zinc oxide whiskers. At the time of making these ferrules, it was found that the fluidity of the resin composition was unfavorable.

For these ferrules, the optical connector connection loss, roundness, breaking strength, optical connector connection loss change between before and after the heat cycle test, and optical connector connection loss change caused by repeated attachment/detachment were measured as in Example 1. The results were shown in Table 1. As shown in Table 1, it has been seen that each of the optical connector connection loss and roundness becomes greater than that in the ferrule of Example 1. It has also been found that the breaking strength decreases to one half that of the ferrule in Example 1, and that the each of the optical connector connection loss change between before and after the heat cycle test and the optical connector connection loss change caused by repeated attachment/detachment is at least doubled.

Comparative Example 2

Ferrules for MT connectors were made in a manner similar to Example 1 except that the PPS resin, silica particles, and zinc oxide whiskers in the resin composition were mixed at their respective contents shown in Table 1, while using silica particles having an average particle size of 0.5 μm as the silica particles, and calcium silicate whiskers having an average fiber length of 8 μm and an average diameter of 2 μm (FPW400 manufactured by Kinsei Matec Co., Ltd.) and zinc oxide whiskers whose needle-like portions have an average length of 30 μm and an average diameter of 3 μm as the whiskers. At the time of making these ferrules, it was found that the fluidity of the resin composition was unfavorable.

For these ferrules, the optical connector connection loss, roundness, breaking strength, optical connector connection loss change between before and after the heat cycle test, and optical connector connection loss change caused by repeated attachment/detachment were measured as in Example 1. The results were shown in Table 1. As shown in Table 1, it has been seen that each of the optical connector connection loss changes and roundness becomes greater than that of the ferrule of Example 1 by about two times.

Comparative Example 3

A ferrule for MT connector was made in a manner similar to Example 1 except that the PPS resin, silica particles, and zinc oxide whiskers in the resin composition were mixed at their respective contents shown in Table 1. At the time of making these ferrules, it was found that the fluidity of resin composition was unfavorable.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that each of the optical connector connection loss, roundness, and optical connector connection loss change caused by repeated attachment/detachment becomes much greater than that in the ferrule of Example 1, whereas the breaking strength decreases to about one half that of the ferrule of Example 1.

Comparative Example 4

Ferrules for MT connectors were made in a manner similar to Example 1 except that the PPS resin, silica particles, and zinc oxide whiskers were mixed at their respective contents shown in Table 1.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that each of the optical connector connection loss, roundness, and optical connector connection loss changes becomes much greater than that in the ferrule of Example 1.

Comparative Example 5

Ferrules for MT connectors were made in a manner similar to Example 1 except that the PPS resin, silica particles, and zinc oxide whiskers in the resin composition were mixed at their respective contents shown in Table 1.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that each of the optical connector connection loss, roundness, and optical connector connection loss changes becomes much greater than that in the ferrule of Example 1, and that the roundness increases in particular.

Comparative Example 6

Ferrules for MT connectors were made in a manner similar to Example 1 except that the PPS resin, silica particles, and zinc oxide whiskers in the resin composition were mixed at their respective contents shown in Table 1.

For these ferrules, the optical connector connection loss, roundness, breaking strength, optical connector connection loss change between before and after the heat cycle test, and optical connector connection loss change caused by repeated attachment/detachment were measured. The results were shown in Table 1. As shown in Table 1, it has been seen that the optical connector connection loss change in the repeated attachment/detachment test becomes greater, and that the breaking strength becomes much smaller than that in Example 1.

As explained in the foregoing, since a resin composition contains a PPS resin containing a linear type PPS resin at a content in the range of 24% to 30% by weight, silica particles 61% to 67% by weight, and tetrapod-shaped whiskers 6% to 12% by weight, the optical fiber positioning member in accordance with the present invention can improve not only its dimensional accuracy, but also its mechanical strength, dimensional stability, and long-term durability.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multichannel ferrule for optical connector comprising a resin composition containing polyphenylene sulfide resin mainly composed of a linear type polyphenylene sulfide resin at a content in the range of 24% to 30% by weight, silica particles at a content in the range of 61% to 67% by weight, and tetrapod-shaped whiskers having needle-like portions with an average diameter of 0.2 to 2 μm at a base part thereof at a content in the range of 6% to 12% by weight.

2. A multichannel ferrule according to claim 1, wherein said silica particles have one relative maximum value in each of particle size ranges of 0.3 to 0.8 μm to 4 to 7 μm in particle size distribution thereof.

3. A multichannel ferrule according to claim 1, wherein said tetrapod-shaped whiskers are zinc oxide whiskers.

4. A multichannel ferrule according to claim 1, wherein said polyphenylene sulfide resin contains said liner type polyphenylene sulfide resin at a content in the range of 95% to 100% by weight.

5. A multichannel ferrule according to claim 1, wherein said linear type polyphenylene sulfide resin has a melting viscosity of 100 to 500 poises at 300° C.

6. A multichannel ferrule according to claim 1, wherein said silica particles have an average particle size of 0.2 to 7 μm.

7. A multichannel ferrule according to claim 1, wherein said resin composition contains said tetrapod-shaped whiskers at a content in the range of 8% to 12% by weight.

8. A multichannel ferrule according to claim 1, wherein said resin composition contains said tetrapod-shaped whiskers at a content in the range of 6% to 10% by weight.

9. A multichannel ferrule according to claim 1, wherein said resin composition contains said tetrapod-shaped whiskers at a ratio in the range of 8% to 10% by weight.

10. A multichannel ferrule according to claim 1, wherein said resin composition contains said silica particles and said tetrapod-shaped whiskers at a total content in the range of 70% to 76% by weight.

11. A plug for optical connector, comprising:

the multichannel ferrule according to claim 1, a ferrule securing member for accommodating the multichannel ferrule therein; and a cover for accommodating the ferrule securing member therein.

12. An optical connector, comprising:

a pair of plugs according to claim 11, an adapter having a guide hole for guiding and accommodating the plugs, and a pair of guide pins for connecting the plugs to each other.

* * * * *